UNITED STATES PATENT OFFICE.

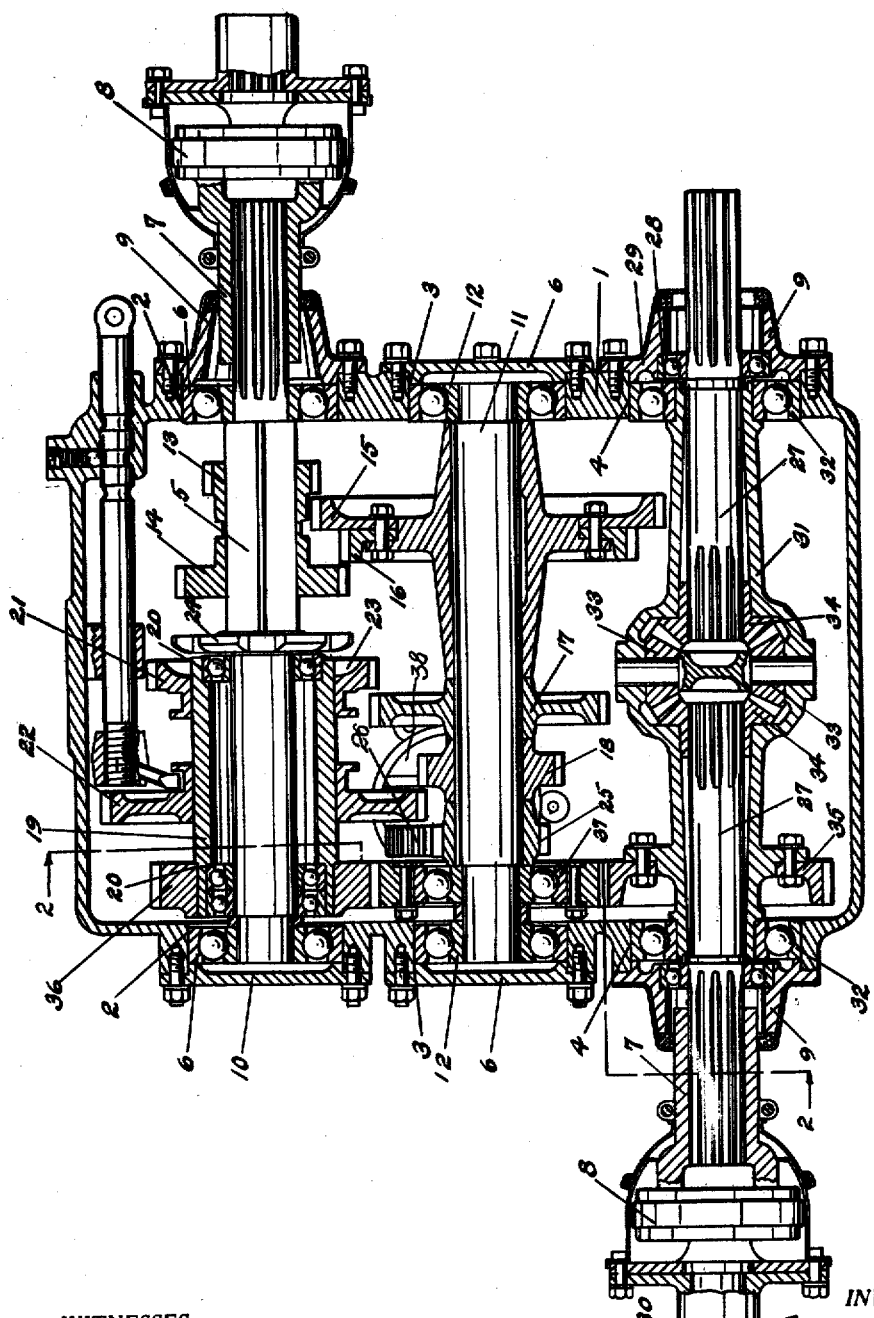

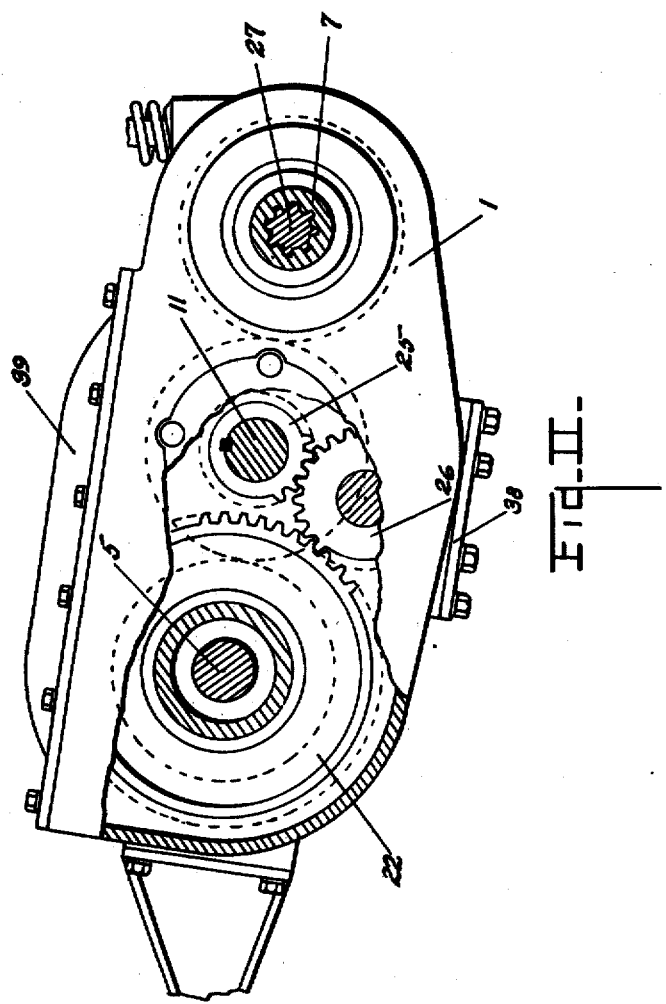

GEORGE J. THOMAS, OF LANSING, MICHIGAN, ASSIGNOR TO DUPLEX TRUCK COMPANY, OF LANSING, MICHIGAN.

VARIABLE-SPEED GEARING.

1,323,501.     Specification of Letters Patent.     Patented Dec. 2, 1919.

Application filed August 31, 1918. Serial No. 252,153.

*To all whom it may concern:*

Be it known that I, GEORGE J. THOMAS, a citizen of the United States, residing at the city of Lansing, county of Ingham, and State of Michigan, have invented certain new and useful Improvements in Variable-Speed Gearing, of which the following is a specification.

This invention relates to improvements in variable speed gearing.

The main objects of this invention are:

First, to provide an improved variable speed gearing which is compact and simple in structure and at the same time provides a considerable number of variations in speed.

Second, to provide a variable speed gearing in which the shafts and gears are all mounted so that the bearings therefor are well supported and accessible.

Third, to provide an improved variable speed gearing which is well adapted for use in four wheel drive motor vehicles.

Further objects, and objects relating to structural details will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a detail longitudinal view mainly in section of a structure embodying the features of my invention.

Fig. II is a detail view partially in transverse section on line corresponding to the broken line 2—2 of Fig. I.

In the drawing, like reference characters refer to like parts in both views.

Referring to the drawing, the casing or gear box 1 is provided with alined openings 2, 2, 3, 3, and 4, 4 adapted to receive the bearings for the driving shaft, jack shaft and differential shafts respectively.

The driving shaft 5 is supported in bearings 6 in the bearing openings 2, one end of the driving shaft projecting to receive shaft member 7 of the universal joint 8 by which it is connected to the source of power, not illustrated. A cap or closure 9 having a housing thereon embracing the shaft member 7 of the universal joint is provided for one of the openings 2, and the plate-like cap or closure member 10 for the other.

A jack shaft 11 is arranged parallel with the driving shaft, the jack shaft being supported in bearings 12 in the bearing openings 3, the bearing openings being closed by cap plates 6. A pair of connected driving gears 13 and 14 are splined to the driving shaft to be adjusted into and out of mesh with the driven gears 15 and 16 respectively secured to the jack shaft. The means for shifting the gears 13 and 14 are not illustrated as suitable means are well known.

The jack shaft 11 is provided with a pair of variable speed driving gears 17 and 18. A tubular driven shaft 19 is mounted on the driving shaft by means of bearings 20. On this driven shaft are driven gears 21 and 22 adapted to coact with the variable speed driving gears 17 and 18 of the jack shaft, the gears 21 and 22 being splined to the driven shaft to be independently adjusted thereon. The gear 21 is provided with the clutch member 23 adapted to coact with the clutch member 24 on the driving shaft thus securing a direct driving connection of the driven shaft with the driving shaft.

The jack shaft is also provided with a reverse driving gear 25 meshing with a reverse idler 26, the gear 22 on the driven shaft being adapted to be shifted into and out of mesh with this idler thereby securing a reverse drive for the driven shaft and as the jack shaft has two speeds, two reverse speeds, are provided for the driven shaft and five forward speeds, two speeds being secured by the variable speed connections for the driving shaft and jack shafts, two variable speeds through the connections for the driving shaft to the driven shaft, and the fifth, the direct connection described.

The structure illustrated is especially designed for use on four wheel drive motor structures and to this end I provide a pair of differential shafts 27 disposed in alinement, the bearings 28 of these shafts being carried by the closure plates 29 for the bearing openings 4. These differential shafts project to receive universal joints by which they are connected to the propeller shafts 30, only one of the propeller shafts 30 being shown.

The differential driving member 31 is tubular in form constituting a housing for the shafts 27, and is provided with the bearings 32 arranged in the bearing openings 4. This driving member carries differential pinions 33 coacting with the gears 34 on the shafts 27. The driving member 31 is provided with a gear 35 which is connected to the driven shaft 19 by the gear 36 on the driven shaft, and a gear 37 rotatably mounted on the jack shaft and meshing with the gear 36 and the gear 35.

With this arrangement of parts I secure a gearing having a plurality of forward and reverse speeds which is very compact and strong and one in which the parts are all supported so that they are capable of withstanding heavy loads. The parts are all arranged in the casing so that they are conveniently accessible as occasion requires and are quite easy to machine and assemble.

The casing is provided with an opening in its bottom closed by the plate 38 which permits the cleaning of the casing as occasion requires and also is a matter of convenience in assembling the reverse gear. The cap plate 39 may be removed and when removed the gears are all accessible. I have illustrated and described my improvements for the use in which I have adapted the same on four wheel drive tractors.

I have not attempted to illustrate or describe certain modifications and adaptations which I contemplate as I believe the disclosure made will enable those skilled in the art to which my invention relates to embody or adapt the same as may be desired.

Having thus described my invention, what I claim as new and desire to secure by Letters Patent, is:

1. The combination of a casing, a driving shaft provided with bearings in the walls of said casing, a jack shaft disposed parallel with said driving shaft and provided with bearings in the walls of said casing, a tubular driven shaft provided with bearings on said driving shaft, driving gears on said driving shaft, coacting driven gears on said jack shaft to secure variable speeds for said jack shaft, variable speed driving gears on said jack shaft, coacting variable speed driven gears on said driven shaft, means whereby said driven shaft may be connected directly to said driving shaft, a driving reverse gear on said jack shaft, and a reverse idler meshing with said driving reverse gear of said jack shaft, one of said gears on said driven shaft being adapted to coact with said reverse idler.

2. The combination of a casing, a driving shaft provided with bearings in the walls of said casing, a jack shaft disposed parallel with said driving shaft provided with bearings in the walls of said casing, a tubular driven shaft provided with bearings on said driving shaft, driving gears on said driving shaft, coacting driven gears on said jack shaft to secure variable speeds for said jack shaft, variable speed driving gears on said jack shaft, coacting variable speed driven gears on said driven shaft, and means whereby said driven shaft may be connected directly to said driving shaft.

3. In a variable speed gearing, a driving shaft, a jack shaft disposed parallel with said driving shaft, a tubular driven shaft rotatably mounted on said driving shaft, driven gears on said jack shaft, driving gears on said driving shaft coacting with said driven gears to secure variable speeds for said jack shaft, variable speed driving gears on said jack shaft, variable speed driven gears on said driven shaft coacting with said driving gears on said jack shaft, means whereby said driven shaft may be connected directly to said driving shaft, a driving reverse gear on said jack shaft, and a reverse idler meshing with said driving reverse gear of said jack shaft, one of said gears on said driven shaft being adapted to coact with said reverse idler.

4. The combination of a driving shaft, a jack shaft disposed parallel with said driving shaft, a tubular driven shaft rotatably mounted on said driving shaft, driving gears splined to said driving shaft at the end of said driven shaft, coacting driven gears on said jack shaft to secure variable speeds for said jack shaft, variable speed driving gears on said jack shaft, variable speed driven gears splined to said driven shaft to coact with said driving gears on said jack shaft, one of said driven gears being provided with a clutch member, a coacting clutch member on said driving shaft whereby said driven shaft may be connected directly to said driving shaft, a driving reverse gear on said jack shaft, and a reverse idler meshing with said driving reverse gear of said jack shaft, one of said gears on said driven shaft being adapted to be shifted into mesh with said reverse idler.

5. The combination of a driving shaft, a jack shaft disposed parallel with said driving shaft, a tubular driven shaft rotatably mounted on said driving shaft, driving gears splined to said driving shaft at the end of said driven shaft, coacting driven gears on said jack shaft to secure variable speeds for said jack shaft, variable speed driving gears on said jack shaft, variable speed driven gears splined to said driven shaft to coact with said driving gears on said jack shaft, one of said driven gears being provided with a clutch member, a coacting clutch member on said driving shaft whereby said driven shaft may be connected directly to said driving shaft.

In witness whereof, I have hereunto set my hand and seal in the presence of two witnesses.

GEORGE J. THOMAS. [L. S.]

Witnesses:
H. M. LEE,
G. W. HEWITT.